US012613830B2

(12) United States Patent
Shippy et al.

(10) Patent No.: US 12,613,830 B2
(45) Date of Patent: Apr. 28, 2026

(54) ACCELERATOR ARCHITECTURE ON A PROGRAMMABLE PLATFORM

(71) Applicant: Altera Corporation, San Jose, CA (US)

(72) Inventors: David Shippy, Austin, TX (US); Martin Langhammer, Alderbury (GB); Jeffrey Eastlack, Driftwood, TX (US)

(73) Assignee: Altera Corporation, San Jose, CA (US)

( * ) Notice: Subject to any disclaimer, the term of this patent is extended or adjusted under 35 U.S.C. 154(b) by 0 days.

(21) Appl. No.: 18/368,492

(22) Filed: Sep. 14, 2023

(65) Prior Publication Data

US 2024/0078211 A1 Mar. 7, 2024

Related U.S. Application Data

(63) Continuation of application No. 16/154,517, filed on Oct. 8, 2018, now Pat. No. 11,797,473, which is a continuation-in-part of application No. 14/725,811, filed on May 29, 2015, now Pat. No. 10,095,647.

(60) Provisional application No. 62/004,691, filed on May 29, 2014.

(51) Int. Cl.
| | | |
|---|---|---|
| *G06F 15/80* | (2006.01) | |
| *G06F 9/38* | (2018.01) | |
| *G06F 15/78* | (2006.01) | |
| *G06F 9/30* | (2018.01) | |
| | (Continued) | |

(52) U.S. Cl.
CPC ........ *G06F 15/8023* (2013.01); *G06F 9/3877* (2013.01); *G06F 9/3887* (2013.01); *G06F 9/3888* (2023.08); *G06F 15/7825* (2013.01);

*G06F 9/30036* (2013.01); *G06F 13/124* (2013.01); *G06F 13/28* (2013.01)

(58) Field of Classification Search
CPC ............ G06F 15/8023; G06F 15/7825; G06F 9/3877; G06F 15/8053
See application file for complete search history.

(56) References Cited

U.S. PATENT DOCUMENTS

| | | | |
|---|---|---|---|
| 5,408,677 | A | 4/1995 | Nogi |
| 5,752,071 | A | 5/1998 | Tubbs et al. |
| 7,386,704 | B2 | 6/2008 | Schulz et al. |
| | | (Continued) | |

FOREIGN PATENT DOCUMENTS

| | | |
|---|---|---|
| CN | 101018055 A | 8/2007 |
| CN | 101400178 A | 4/2009 |

OTHER PUBLICATIONS

Gustafson, J.L., Hawkinson, S., Scott, K, "The architecture of a homogeneous vector supercomputer", Springer-Verlag, pp. 62-70 (Year: 1986).*

(Continued)

*Primary Examiner* — Courtney P Spann
(74) *Attorney, Agent, or Firm* — InventIQ Legal LLP; Steven J. Cahill

(57) ABSTRACT

An accelerated processor structure on a programmable integrated circuit device includes a processor and a plurality of configurable digital signal processors (DSPs). Each configurable DSP includes a circuit block, which in turn includes a plurality of multipliers. The accelerated processor structure further includes a first bus to transfer data from the processor to the configurable DSPs, and a second bus to transfer data from the configurable DSPs to the processor.

26 Claims, 14 Drawing Sheets

(51) Int. Cl.

| | |
|---|---|
| *G06F 13/12* | (2006.01) |
| *G06F 13/28* | (2006.01) |

(56) References Cited

U.S. PATENT DOCUMENTS

| | | | |
|---|---|---|---|
| 7,856,545 B2 | 12/2010 | Casselman | |
| 8,495,122 B2 | 7/2013 | Simkins et al. | |
| 8,612,725 B2 * | 12/2013 | Tanabe | G06F 12/084 711/133 |
| 2002/0103841 A1 | 8/2002 | Parviainen | |
| 2003/0055861 A1 | 3/2003 | Lai et al. | |
| 2003/0088757 A1 | 5/2003 | Lindner et al. | |
| 2004/0008201 A1 * | 1/2004 | Lewis | G06F 9/3887 345/503 |
| 2005/0114565 A1 * | 5/2005 | Gonzalez | G06F 3/00 710/36 |
| 2005/0144210 A1 * | 6/2005 | Simkins | H03K 19/17732 708/490 |
| 2005/0171990 A1 * | 8/2005 | Bishop | G06F 15/8023 708/501 |
| 2005/0198472 A1 | 9/2005 | Sih | |
| 2005/0216700 A1 * | 9/2005 | Honary | G06F 15/17393 712/15 |
| 2007/0250681 A1 * | 10/2007 | Horvath | G06F 9/30036 712/4 |
| 2010/0064115 A1 * | 3/2010 | Hoshi | G06F 9/30043 712/7 |
| 2012/0311302 A1 * | 12/2012 | Yang | H03M 13/6561 712/E9.034 |
| 2013/0080739 A1 * | 3/2013 | Kyo | G06F 9/3887 712/42 |
| 2016/0006471 A1 * | 1/2016 | Pande | H04L 45/02 455/500 |

OTHER PUBLICATIONS

Tanqueray, D.A, "The Floating Point Systems T Series", Springer-Verlag Berlin Heidelberg, pp. 307-317 (Year: 1988).*

Rodney J. Fazzari and John D. Lynch, "The Second Generation Fps T Series: An Enhanced Parallel Vector Supercomputer", Jan. 1, pp. 61-70 (Year: 1988).*

Chinese Office Action for CN Application No. 201580037571.5 mailed Nov. 5, 2018; 7 Pages.

EP Office Action for European Application No. 19166751.8 Mailed on Feb. 26, 2021 7 Pages.

Wu et al. "A Programming model and a NoC-based architecture for streaming application," 2010 IEEE, 13th Euromicro Conference on Digital System Design: Architectures, Methods and Tools, Grenoble, France, 5 Pages.

CN Office Action for Chinese Application No. 201910218813.0 Mailed on Jan. 4, 2023.

EP Office Action for European Application No. 15800257.6-1203 Mailed on Aug. 2, 2023; 7 Pages.

Wenhua Fan et al: "Efficient Implementation of OFDM Inner Receiver on a Programmable Multi-Core Processor Platform", IEICE Transaction on Communication, Communications Society, Tokyo, JP, vol. E95B, No. 4, Apr. 1, 2012 (Apr. 1, 2012), pp. 1241-1248, XP001575071, ISSN: 0916-8516, DOI: 10.1587/TRANSCOM.E95.B.1241 [retrieved on Apr. 1, 2012].

Gerard J.M. Smit, et al., "Multi-core architectures and streaming applications," SLIP '08: Proceedings of the 2008 International workshop on System level interconnect prediction, Apr. 2008, pp. 35-42, https://doi.org/10.1145/1353610.1353618.

EP Office Action for European Application No. 19166751.8 Mailed on Oct. 10, 2023 9 Pages.

Lertora F et al: "Handling Different Computational Granularity by a Reconfigurable IC Featuring Embedded FPGAs and a Network-on-Chip", Field-Programmable Custom Computing Machines, 2005. FCCM 2005. 183th an Nual IEEE Symposium on Napa, CA, USA Apr. 18-20, 2005, Piscataway, NJ, USA, IEEE, Apr. 18, 2005 (Apr. 18, 2005), pp. 45-54, XP010841256, DOI: 10.1109/FCCM.2005.39 ISBN: 978-0-7695-2445-0.

* cited by examiner

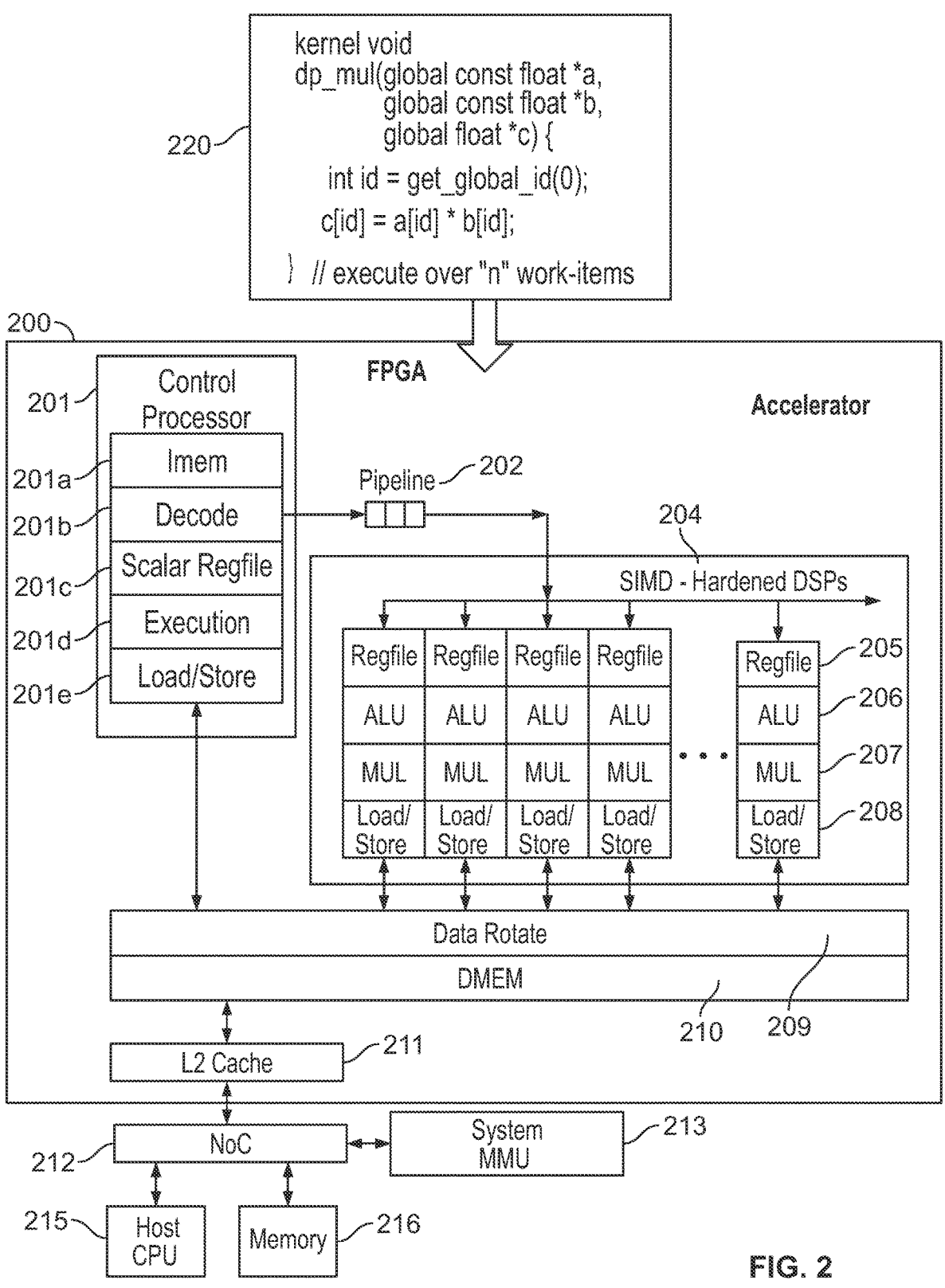

```
kernel void
dp_mul(global const float *a,
       global const float *b,
       global float *c) { int id = get_global_id(0);

c[id] = a[id] * b[id];

} // execute over "n" work-items
```

220

200

FPGA

201    Control Processor

201a    Imem

201b    Decode

201c    Scalar Regfile

201d    Execution

201e    Load/Store

Pipeline — 202

Accelerator

204

SIMD - Hardened DSPs

| Regfile | Regfile | Regfile | Regfile | Regfile |
|---------|---------|---------|---------|---------|
| ALU | ALU | ALU | ALU | ALU |
| MUL | MUL | MUL | MUL | MUL |
| Load/Store | Load/Store | Load/Store | Load/Store | Load/Store |

205
206
207
208

Data Rotate

DMEM 210    209

L2 Cache — 211

NoC — 212

System MMU — 213

Host CPU — 215

Memory — 216

FIG. 2

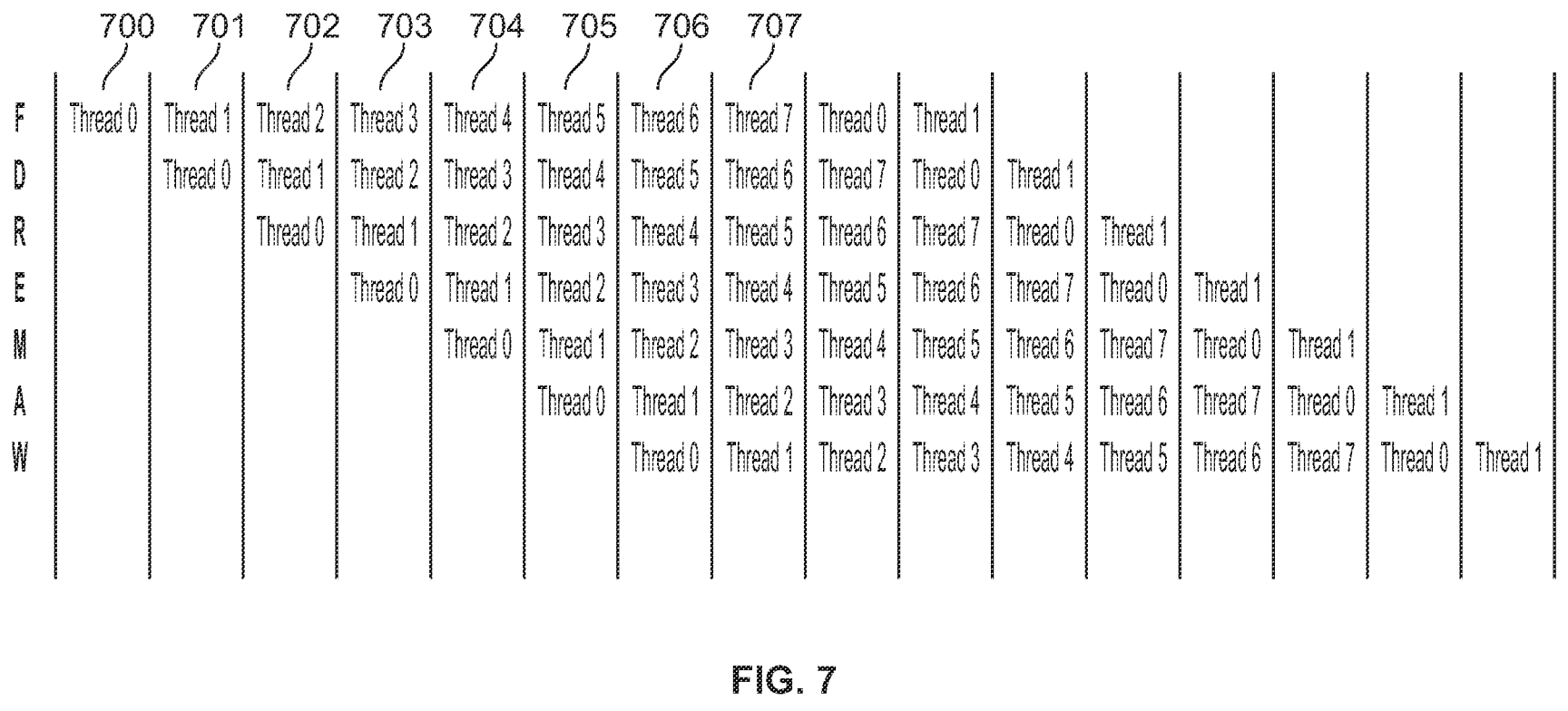

|   | 700 | 701 | 702 | 703 | 704 | 705 | 706 | 707 | | | | | | | |
|---|---|---|---|---|---|---|---|---|---|---|---|---|---|---|---|
| F | Thread 0 | Thread 1 | Thread 2 | Thread 3 | Thread 4 | Thread 5 | Thread 6 | Thread 7 | Thread 0 | Thread 1 | | | | | |
| D | | Thread 0 | Thread 1 | Thread 2 | Thread 3 | Thread 4 | Thread 5 | Thread 6 | Thread 7 | Thread 0 | Thread 1 | | | | |
| R | | | Thread 0 | Thread 1 | Thread 2 | Thread 3 | Thread 4 | Thread 5 | Thread 6 | Thread 7 | Thread 0 | Thread 1 | | | |
| E | | | | Thread 0 | Thread 1 | Thread 2 | Thread 3 | Thread 4 | Thread 5 | Thread 6 | Thread 7 | Thread 0 | Thread 1 | | |
| M | | | | | Thread 0 | Thread 1 | Thread 2 | Thread 3 | Thread 4 | Thread 5 | Thread 6 | Thread 7 | Thread 0 | Thread 1 | |
| A | | | | | | Thread 0 | Thread 1 | Thread 2 | Thread 3 | Thread 4 | Thread 5 | Thread 6 | Thread 7 | Thread 0 | Thread 1 |
| W | | | | | | | Thread 0 | Thread 1 | Thread 2 | Thread 3 | Thread 4 | Thread 5 | Thread 6 | Thread 7 | Thread 0 | Thread 1 |

FIG. 7

4-byte Mis-aligned Memory Access 4-byte Aligned Memory Access

ACCELERATOR ARCHITECTURE ON A PROGRAMMABLE PLATFORM

CROSS REFERENCE TO RELATED APPLICATIONS

This is a continuation of U.S. patent application Ser. No. 16/154,517, filed on Oct. 8, 2018, which claims benefit of U.S. patent application Ser. No. 14/725,811, filed on May 29, 2015, which claims the benefit of copending, commonly-assigned U.S. Provisional Application No. 62/004,691, filed on May 29, 2014, which is hereby expressly incorporated by reference in their entirety.

FIELD OF THE INVENTION

This invention relates to a processor-centric programmable circuit structure hosting and operating multiple heterogeneous accelerators.

BACKGROUND OF THE INVENTION

An accelerator includes hardware to assist a processor to perform certain functions. The accelerator can perform a dedicated function faster than software running on a more general-purpose central processing unit (CPU), because the accelerator may be designed for computationally intensive tasks. Example accelerators can include digital signal processors (DSPs). For example, an accelerator can include one or more DSP blocks that receive and process data from a memory unit outside the accelerator, and then output the processed data to the memory unit outside the accelerator. When the data volume is high, memory access attempts outside a DSP block can be inefficient, and even be missed. In this way, task execution can stall and subsequent instructions may be prevented within the DSP block.

SUMMARY OF THE INVENTION

In accordance with embodiments of the present invention, a configurable DSP with an embedded Arithmetic Logic Unit (ALU) is introduced. The configurable DSP can further include embedded data cache and alignment units within the configurable DSP to improve memory access performance. Multiple configurable DSPs can be operated in a parallel structure on a programmable circuit device. The configurable DSP blocks can be integrated into a vector Single Instruction, Multiple Data (SIMD) architecture, which provides a front-end multi-threaded processor control as well as data memories. In addition, a hardware cache coherent memory can be included in the vector architecture to allow efficient data movement among the DSP blocks and reduce constant access attempts for data from an external memory.

Therefore, in accordance with embodiments of the present invention there is provided an accelerated processor structure on a programmable integrated circuit device. The accelerated processor structure includes a processor and a plurality of configurable DSPs. Each configurable DSP includes a circuit block, which in turn includes a plurality of multipliers. The accelerated processor structure further includes a first bus to transfer data from the processor to the configurable DSPs, and a second bus to transfer data from the configurable DSPs to the processor.

In accordance with another embodiment of the present invention there is provided a method of configuring an accelerated processor structure used for a programmable integrated circuit device. The method includes providing a processor, and providing a plurality of configurable DSPs. At least one of the configurable DSPs includes a circuit block, including, a plurality of multipliers, a first adder for adding multiplier outputs from the plurality of multipliers, and a second adder for adding data inputs to the circuit block to obtain an adder result, and outputting the adder result to at least one multiplier in the plurality of multipliers. The method further includes configuring interconnections between the plurality of multipliers, the first adder and the second adder to selectively route data connections within the circuit block. The method further includes configuring an ALU that performs an arithmetic operation on the data inputs of the circuit block to generate an ALU output that is routed to one of the data inputs of the circuit block.

In accordance with another embodiment of the present invention there is provided

BRIEF DESCRIPTION OF THE DRAWINGS

Further features of the invention, its nature and various advantages will be apparent upon consideration of the following detailed description, taken in conjunction with the accompanying drawings, in which like reference characters refer to like parts throughout, and in which:

FIGS. 2-3 show example block diagrams illustrating an example accelerator (or an accelerated processor) structure (e.g., which can be placed at a position similar to that of block 107 in FIG. 1 on a programmable circuit) on a programmable circuit device;

FIGS. 6-7 show example block diagrams illustrating aspects of multi-threaded execution using an accelerator similar to 200 discussed in FIG. 2;

DETAILED DESCRIPTION OF THE INVENTION

Unless otherwise indicated, the discussion that follows will be based on an example of a programmable integrated circuit device such as a Field-Programmable Gate Array (FPGA). However, it should be noted that the subject matter disclosed herein may be used in any kind of fixed or programmable device, including, but not limited to, an application-specific integrated circuit (ASIC).

Figure 1:
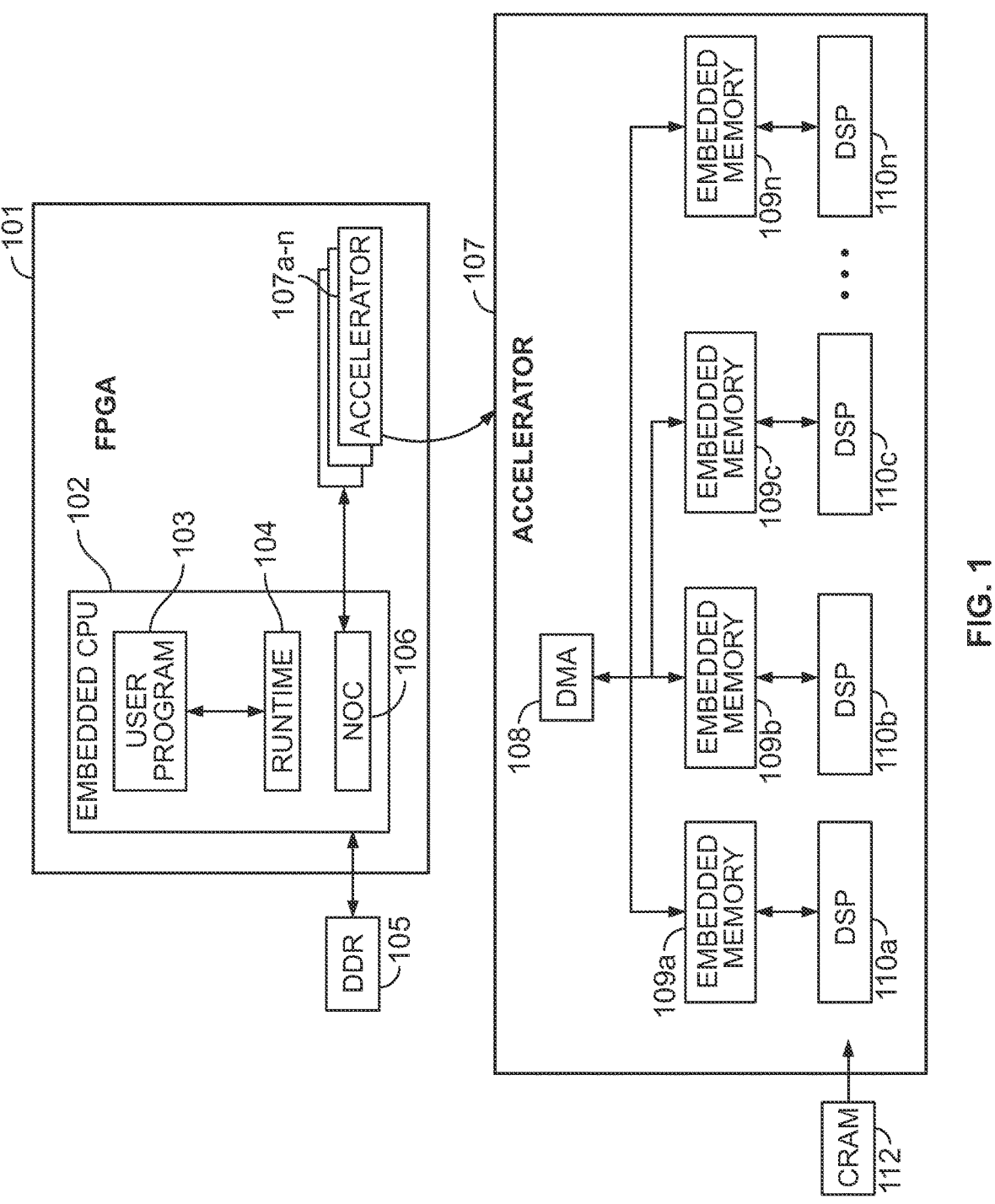
FIG. 1 shows an example block diagram illustrating a programmable circuit 101 having multiple accelerators.

FIG. 1 shows an example block diagram illustrating a programmable circuit 101 having multiple accelerators. For example, the programmable circuit 101 can be an Application-Specific Standard Product (ASSP) or a FPGA. The programmable circuit 101 has an embedded Central Processing Unit (CPU) 102, which communicates with and controls a plurality of accelerators 107a-n. The embedded CPU 102 may include a user program module 103 that communicates with a runtime library module 104 to execute software instructions. For example, the user program module 103 and the runtime library module 104 can be implemented with various APIs such as but not limited to Open Computing Language (OpenCL) API, and/or the like. The embedded CPU 102 may obtain software instructions from a Double Data Rate (DDR) memory unit 105 via a Network-on-a-Chip (NoC) component 106. The NoC 106 may also communicate with accelerators 107 to provide access for the accelerators 107 to the DDR 105.

The accelerators 107a-n, as further illustrated at block 107, can include a Direct Memory Access (DMA) unit 108, which connects with multiple embedded memory blocks 109a-n; and each of the embedded memory blocks 109a-n is connected to a DSP 110a-n. The DSP blocks 110a-n can be configured by a Configuration Random Access Memory (CRAM) unit 112, which, as shown in FIG. 1, can be disposed outside of the accelerator on the FPGA block 101.

Figure 3:
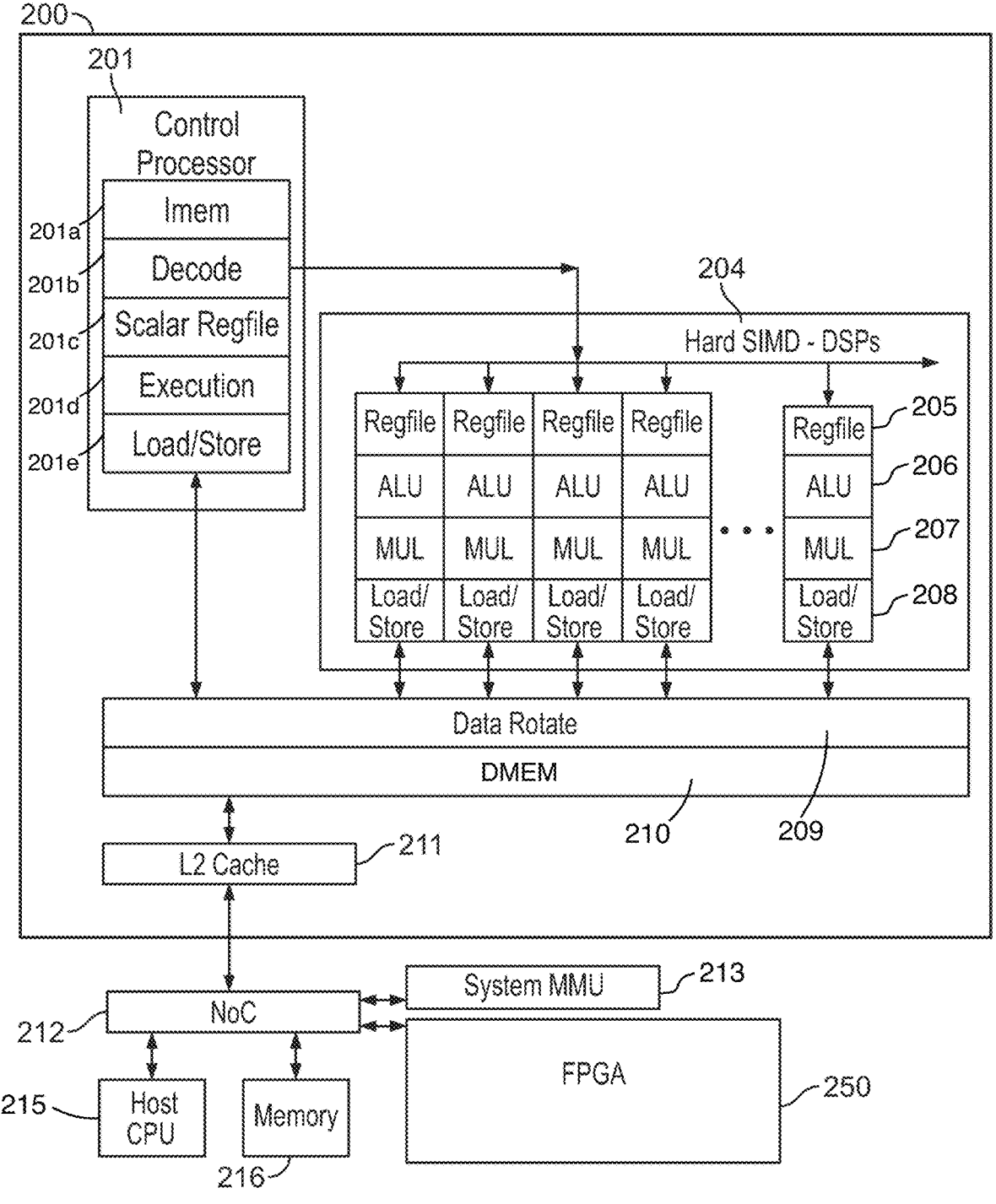

FIGS. 2-3 show example block diagrams illustrating an example accelerator (or an accelerated processor) structure (e.g., which can be placed at a position similar to that of block 107 in FIG. 1 on a programmable circuit) on a programmable circuit device. The accelerator 200 may include a control processor 201. The control processor 201 can include a series of functional units such as but not limited to Instruction Memory 201a (IMEM) that stores instructions for execution by the control processor 201, a decoder 201b, a scalar register file 201c, an execution module 201d to execute instructions in IMEM 201a, and a load/store unit 201e to load or store instructions from data stores (e.g., Data Rotate Unit 209 and Data Memory (DMEM) 210) in the accelerator 200. The control processor 201 may perform fetch, decode, dispatch of processing element (PE) instructions.

Execution of the control processor instructions can be pipelined by a series of pipeline registers 202, and processed at vector SIMD Processing Elements (PEs) 204, which can include hardened DSPs. For example, the SIMD PEs 204 can be built from a specialized hard DSP block of the type available, e.g., on STRATIX® FPGAs from Altera Corporation, of San Jose, California, and each has a local register file 205, Arithmetic Logic Units (ALUs) 206, multipliers 207 and load/store units 208 (e.g., 32 bit integer) to interface with memory data stores such as a Data Rotate Unit 209 and DMEM 210. The memory elements 209-210 can be built from embedded memories. A system cache 211 is adopted to load data from elements outside the SIMD PE 204, such as data storage access instructions from a system memory management unit (SMMU) 213 via the NoC 212, software instructions from a memory 216 or the processor issued instructions from a host CPU 215. The SIMD PE 204 may execute a 32 bit integer and single-precision float data for data processing. The control processor 201 and the SIMD PEs 204 can be connected by one or more data transfer buses, e.g., one data transfer bus to transfer instructions from the control processor 201 to the SIMD PEs 204, and another data transfer bus to transfer processing data from the SIMD PEs 204 to the control processor 201. The SIMD PEs 204 may load processing data via the load/store element 208 and send the processing data to a data transfer bus.

In the respective example shown in FIG. 2, the accelerator 200 can be programmed under an Application Programming Interface (API) protocol. For example, the Kernel 220 can be compiled and sent down to a PE instruction set architecture to be executed by the SIMD PE 204, and the instruction set can be loaded and executed from memory units such as 209-210. By way of example only, the example code segment at 220 is written in the C programming language using the Open Computing Language (OpenCL) API. Alternatively, other Application Programming Interface (API) protocols such as Open Multi-Processing (OpenMP), multicore communications application programming interface (MCAPI), and/or the like can be used. Additional or alternative code examples for the code segment of Kernel 220 can include code segment in C, such as:

```
for (i=o;i<64;i++)
    c[i]=a[i]+b[i];
``` which may be compiled down to this scalar assembly code level (which in this case, may require $1+9\times64=577$ instructions):

```
LI R4, 64
loop:
    LD F0, 0(R1)
    LD F2, 0(R2)
    ADD F4, F2, F0
    SD F4, 0(R3)
    ADDIU, R1, 8
    ADDIU, R2, 8
    ADDIU R3, 8
    SUBIU R4, 1
    BNEZ R4, loop
```

When the processing elements are operated in a parallel structure and thus could support a vector data format, vector assembly codes can be used. Example vector assembly codes performing the same function as the scalar assembly codes above, may take a form similar to the following and may require much lesser number of instructions as each of the 64 vector lanes denoted by the Vector Length Register (VLR) receives a copy of the instruction broadcast to perform the operations in parallel which is consistent with the Single Instruction Multiple Data (SIMD) taxonomy. e.g., 5 instructions,

```
L1 VLR, 64
LV V1, R1
LV V2, R2
ADDV V3, V1, V2
SV V3, R3
```

The example OpenCL Kernel 220 can be written in a similar vector form, similar to the following (e.g., assuming a number of 64 SIMD vector lanes, and parameter settings A=V1, B=V2, and C=V3):

```
L1 VLR, 64
LV V1, R1
LV V2, R2
ADDV V3, V1, V2
SV V3, R3
```

In FIG. 2, the accelerator 200 can be built on a FPGA. In FIG. 3, the FPGA 200 can be connected to another FPGA 250 via the NoC 212. The FPGA 250 can include another accelerator structure similar to that of FPGA 200. Alternatively, the FPGA 250 can include multiple DSPs or other PEs to perform different functions than the DSPs 204 in FPGA 200. In a further implementation, the FPGA 250 can be used to synthesize multiple soft accelerators to expand the programmable circuit.

Figure 4:
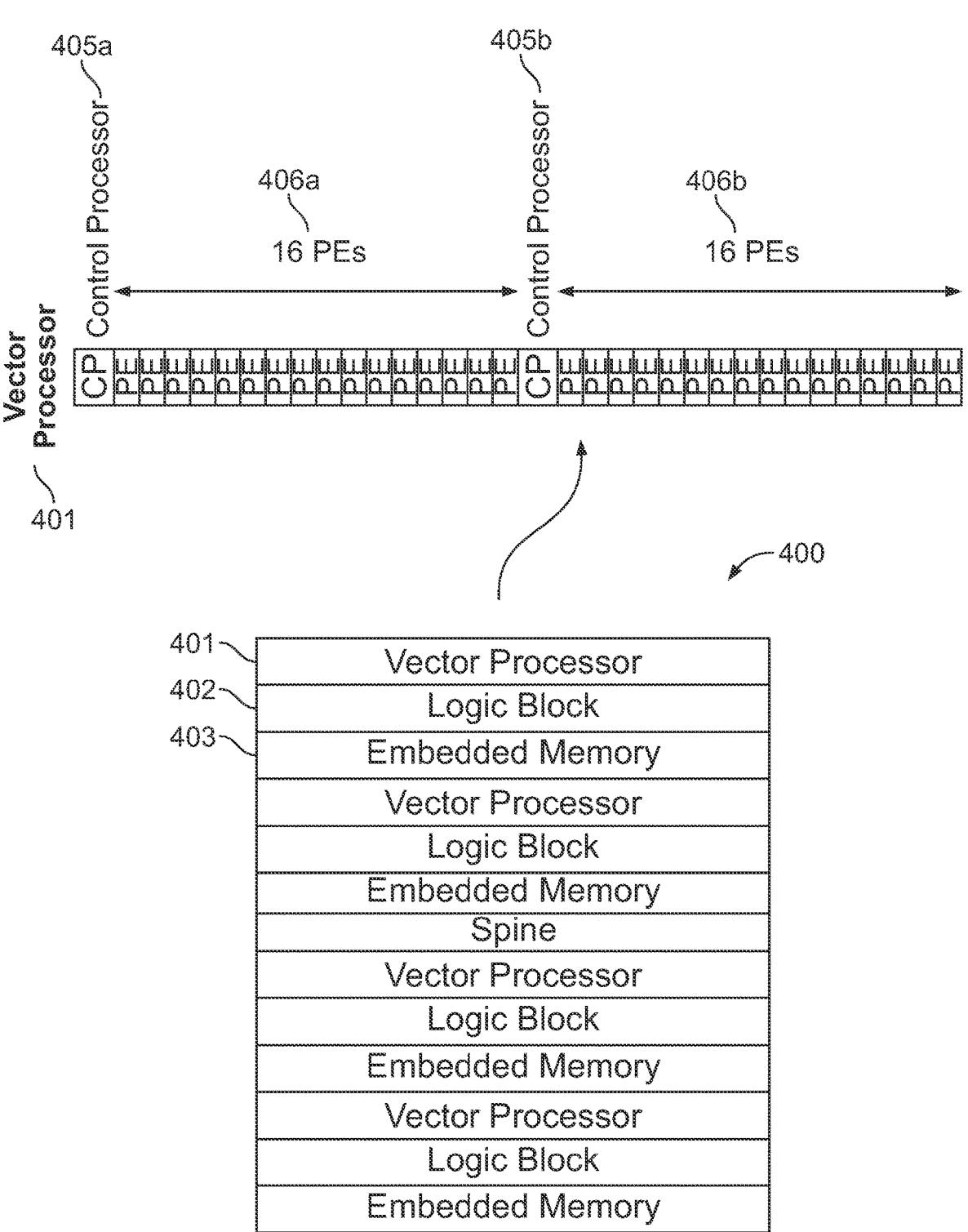
FIG. 4 shows an example block diagram illustrating a column-based sector structure 400 as a building block for a programmable circuit.

FIG. 4 shows an example block diagram illustrating a column-based sector structure 400 as a building block for a programmable circuit. A number of sectors can be placed on an FPGA and connected to form a large scale circuit. In this way, the design rules for each sector may be reused for other sectors to reduce verification effort and improve design efficiency.

For example, sector structure 400 may have multiple columns including the vector processor 401 (which can be configured as the accelerator 200 in FIG. 2), a collection of general-purpose logic blocks 402, a collection of embedded memory units 403, and/or the like. The vector processor column 401 may include 36 rows, including a first control processor 405*a* (e.g., similar to 201 in FIG. 2) that takes up 2 rows, and a first set of 16 PEs 406*a*, (e.g., similar to 204 in FIG. 2); and a second control processor 405*b* (of 2 rows) and a second set of 16 PEs 406*b*. In this example in FIG. 4, the vector processor column 401 includes two vector processors, which in turn include control processors 405*a* and 405*b*, respectively. In another example, a vector processor column can have 1 control processor and 16 DSPs in parallel.

Figure 5:
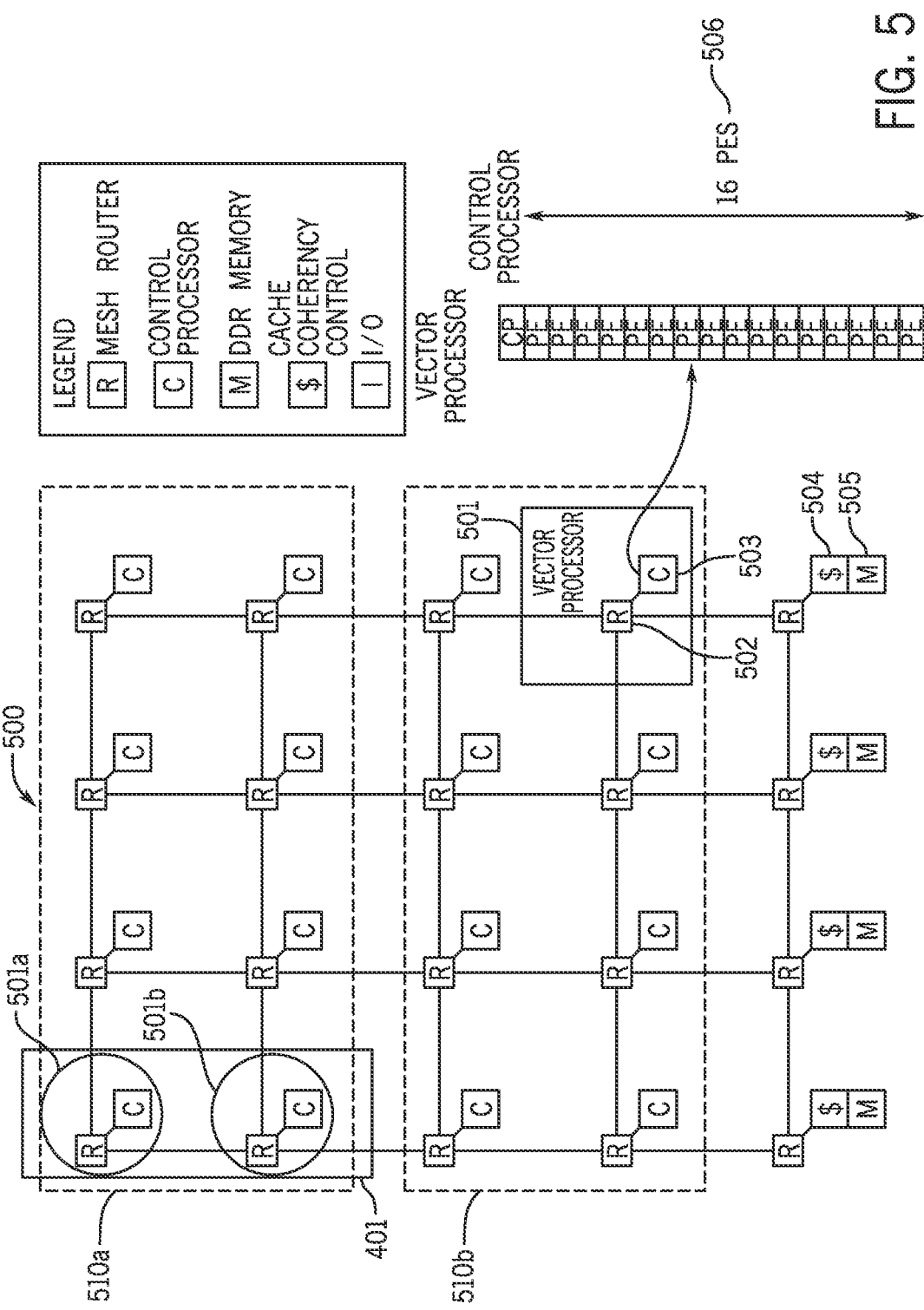
FIG. 5 shows an example block diagram illustrating mesh interconnect logic 500 for vector processors.

FIG. 5 shows an example block diagram illustrating mesh interconnect logic 500 for vector processors. A number of processing nodes, e.g., vector processors 501 (which can be configured as the accelerator 200 in FIG. 2), can be connected in a rectilinear array, with each of the vector processors connected to its nearest neighbors. In the respective example, each node (e.g., each vector processor 501) may include a mesh router 502 that routes a connection from the respective node to the connected nodes, a control processor 503 and 16 PEs 506. The mesh router may also connect a node to an external memory DDR 505 via a cache coherency unit 504 such that the data in the cache units connected to different nodes are consistent. The mesh interconnect structure 500 may have a memory address defined for each column of the mesh interconnect structure 500, e.g., as shown at 500, one node of each column of the structure is connected to an external DDR memory 505.

In connection with the column-based structure in FIG. 4, the mesh interconnect structure 500 can connect multiple column-based sectors, e.g., 510*a-b* (each of which can be configured as 400 in FIG. 4); and two vector processors 501*a-b* can be connected to form a vector processor column analogous to the two-vector-processor column 401 in FIG. 4.

Figure 6:
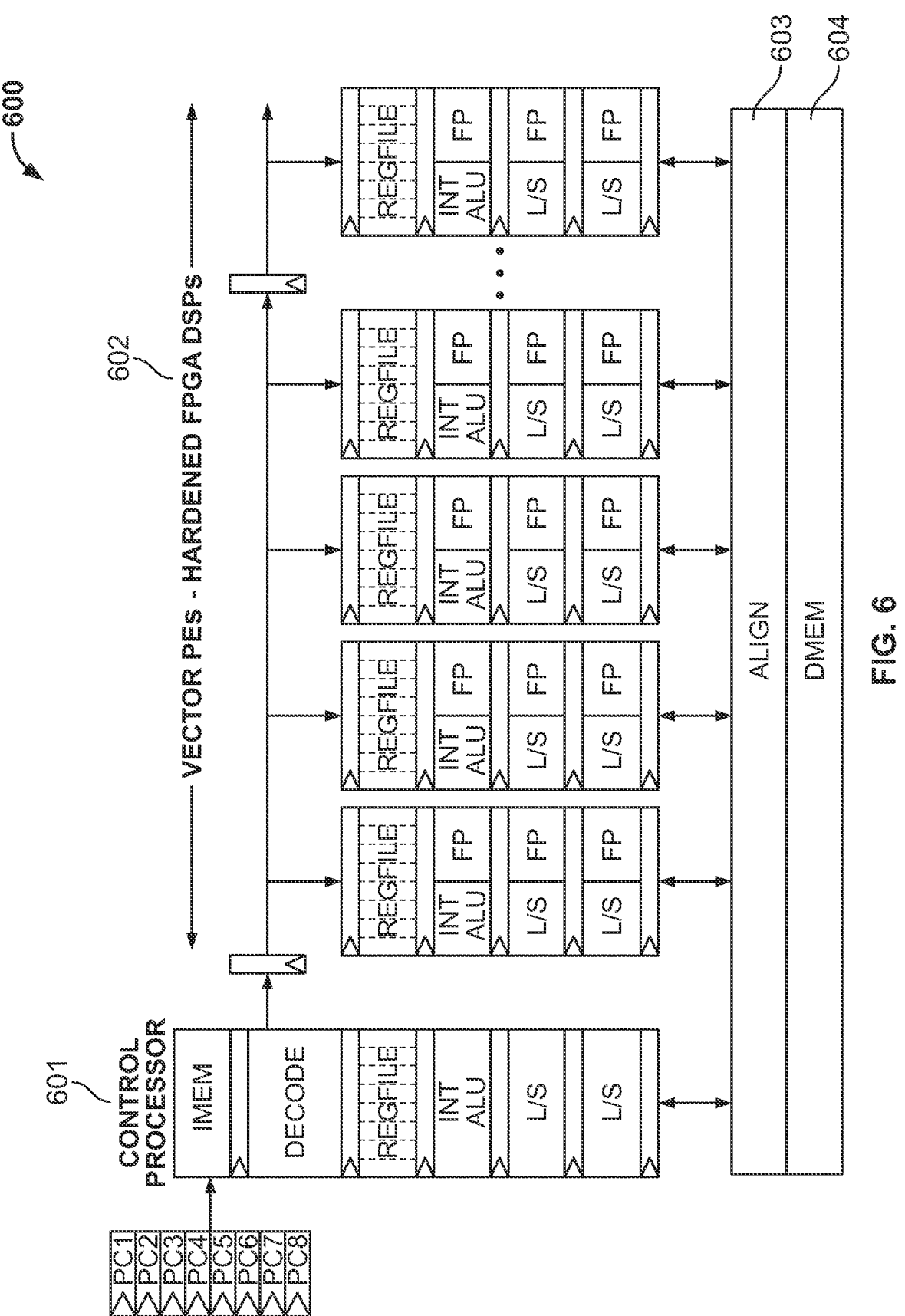

FIGS. 6-7 show example block diagrams illustrating aspects of multi-threaded execution using an accelerator similar to 200 discussed in FIG. 2. In FIG. 6, the vector processor 600 may have a similar structure to the accelerator 200 in FIG. 2, e.g., including a hard control processor 601 (e.g., similar to 201 in FIG. 2) and a number of vector PEs such as hardened FPGA DSPs 602 (e.g., similar to 204 in FIG. 2). The memory address of data obtained from the vector PEs 602 can either be loaded or stored from the DMEM unit 604 which may consist of tightly coupled memory or a standard cache enabled multilevel memory hierarchy. In either case the memory contents will flow through the alignment unit 603 so that the appropriate bytes are loaded to or stored from the register file 201*c* or 205. For example, in a programming language, a data object (e.g., a variable) has two properties: a value and a storage location (e.g., a memory address). The data alignment unit 603 may evenly divide the address of a data object by a natural number, usually a power of two, e.g., 1, 2, 4, or 8, etc. In other words, a data object can have a 1-byte, 2-byte, 4-byte, or 8-byte alignment (or any power-of-two alignment). For instance, when the address of a data object is 12FEECh, then it is a 4-byte alignment because the address can be evenly divisible by 4, which is the largest natural number that is a power of two to divide the address evenly.

At FIG. 7, 8 threads of executions 700-707 can be supported by the vector processor 600. Each thread has one program counter, and a separate register file. In this respective example, instructions for a given thread are dispatched by the control processor 601 every 8 cycles in a round robin fashion; and if a load instruction stalls in a given thread, it can be revisited every 8 cycles. In this way, a stalled instruction in thread 0 may not affect execution of instructions in thread 1, and most importantly by the time the thread 0 700 is revisited by the processor; and any stall from a memory access will be resolved.

In another example, the vector PEs 602 (e.g., DSPs) may be deeply pipelined, and the pipeline depth can be different from the number of stages of the control processor 601. For example, if the control processor 601 has 8 stages, the multi-threaded execution can have a different number of threads, e.g., 4 threads in a row, because it may take a longer time for the control processor 601 to issue instructions to the PEs/DSPs 602 and thus the PEs/DSPs 602 may handle a smaller number of threads.

Figure 8:
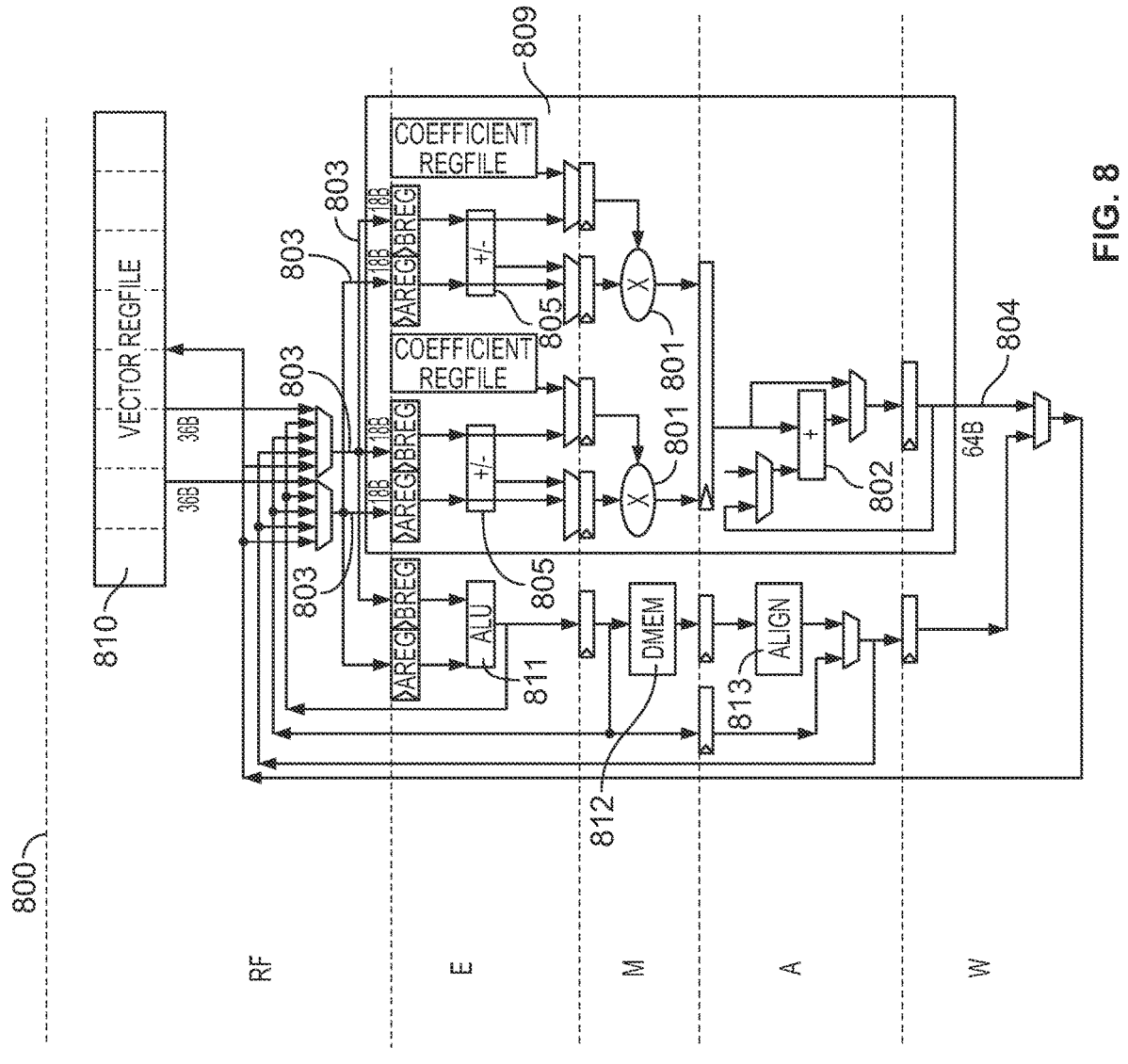
FIG. 8 shows an example schematic diagram illustrating an example structure of a PE 800 (which can be configured as 204 in FIG. 2, 602 in FIG. 6, etc.)

FIG. 8 shows an example schematic diagram illustrating an example structure of a PE 800 (which can be configured as 204 in FIG. 2 or 602 in FIG. 6). The PE 800 can include a circuit block 809 that can be a basic DSP block. For example, the DSP block 809 can include two or more multipliers 801, and an adder 802 that adds the outputs from the two or more multipliers 801 to generate an output 804 of the DSP block 809. The DSP block 809 can receive input data 803, which can be processed by one or more pre-multiplier adders 805. The DSP block 809 can be built on a programmable logic such as a FPGA such that one or more arithmetic or logical elements (e.g., 801, 802, 805, etc.) disposed within the DSP block 809 can be used or bypassed by configuring data connections between these arithmetic or logical elements. In this way, the DSP block 809 can be configured to perform a variety of functions.

An ALU 811 (which can be configured as the ALU 206 in FIG. 2) can be disposed within the PE 800. The ALU 811 can perform an arithmetic or logic operation on the input data 803 of the DSP block 809, and the output of the ALU 811 is routed back to the input of the DSP block 809. For example, the ALU 811 can be configured to add, subtract, invert, and/or perform other arithmetic operations on the input data.

A data cache unit DMEM 812 (which can be configured as DMEM 210 in FIG. 2) can also be included within the PE 800. The DMEM 812 can store an output from the ALU 811 representing processing data from the DSP block 809. The DMEM 812 can serve as a data cache for the DSP block 809 such that the DSP block 809 can reduce memory access to a memory unit outside the PE 800 during an operation of the DPS block 809, and thus data access efficiency can be improved.

The local memory DMEM 812 can have an 8-KB data cache for instructions, and an 8-entry load miss queue can be stored in data cache DMEM 812 to recover missed load (e.g., one entry per thread). When a load miss occurs, the load unit (e.g., 208 in FIG. 2) may stall and prevent subsequent and independent data loads until the previous load miss is resolved, which may renders the data processing performance undesirable on processors, especially in multi-threaded executions. A non-blocking data cache can allevi-ate this issue by putting the missed load address into a "load miss queue" and thus allows other load instructions to issue to the load unit. A load miss remains in the load miss queue even when a cache miss is served by the load/store unit. When the missing memory block associated with the load miss is fetched from memory, the load miss is then removed from the load miss queue.

Because of the non-blocking data cache structure, the cache miss penalties can be overlapped and masked by the processing of subsequent and independent instructions. The load miss queue can store multiple and independent load misses which can be served concurrently by the load/store unit such that the total load miss impacts can be reduced. Reduction of load miss impacts can also be accomplished in a "burst mode," under which multiple memory access requests are grouped into a single transaction. For example, an "8 beat" memory burst groups 8 memory access requests into a single transaction to implement 8 access attempts all at once. In this way, the setup overhead of memory accesses can be reduced from 8 down to 1.

The PE 800 can further include a data alignment unit 813 (which can be analogous to the alignment unit 603 in FIG. 6). For example, the alignment unit 813 may align the cache line output from DMEM 812 for an appropriate data word. When a 128-bit cache line size (from DMEM 812) is adopted, then the lower two address bits can be used to select the relevant 32-bit data word. Further discussion on the data alignment is provided in connection with FIG. 11.

The DMEM 812 and data alignment unit 813 can be disposed within each PE 800, as shown in FIG. 8. As another example, when multiple PEs 800 are operated in a parallel structure, the DMEM 812 and data alignment unit 813 can be disposed outside an individual PE 800, and shared by multiple PEs 800, as shown at 603, 604 in FIG. 6.

The PE 800 may further include a register file 810 that registers the output data of the DSP block 809 or the output of the data alignment unit 813, and provides input data to the DSP block 809. In one example, each individual PE 800 may have a register file 810 within the PE 800 structure. When multiple PEs 800 are operated in a parallel structure, the multiple register files 810 associated with the multiple PEs 800 can be operated as a vector register file.

Data flows within the PE can be processed with 32-bit scalar operations in a 32-bit single precision floating point data format, and may be shifted in a 32-bit barrel. The register file 810 can be placed within a DSP block 809 (e.g., see 205 in FIG. 2), or outside the DSP block 809. The SIMD PE may implement a multi-threaded execution (e.g., 8 threads as shown in FIG. 7), and each thread may have an 8×32×32-bit register file 810, including two 32-bit read ports and one 32-bit write port.

Figure 9:
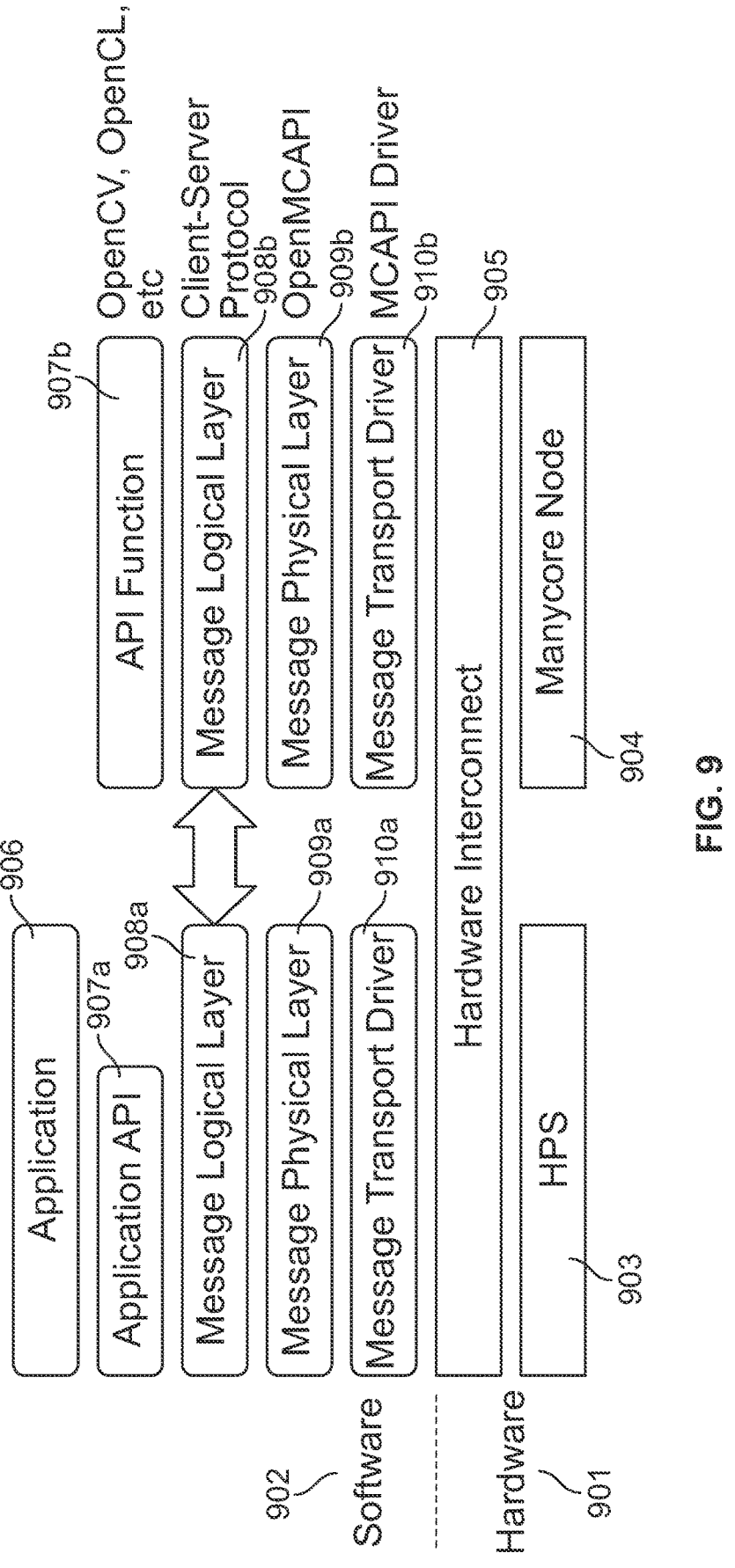
FIGS. 9-10 show example block diagrams illustrating a many-core SoC software stack structure for implementing MCAPI on the FPGA 200 in FIG. 2.
Figure 10:
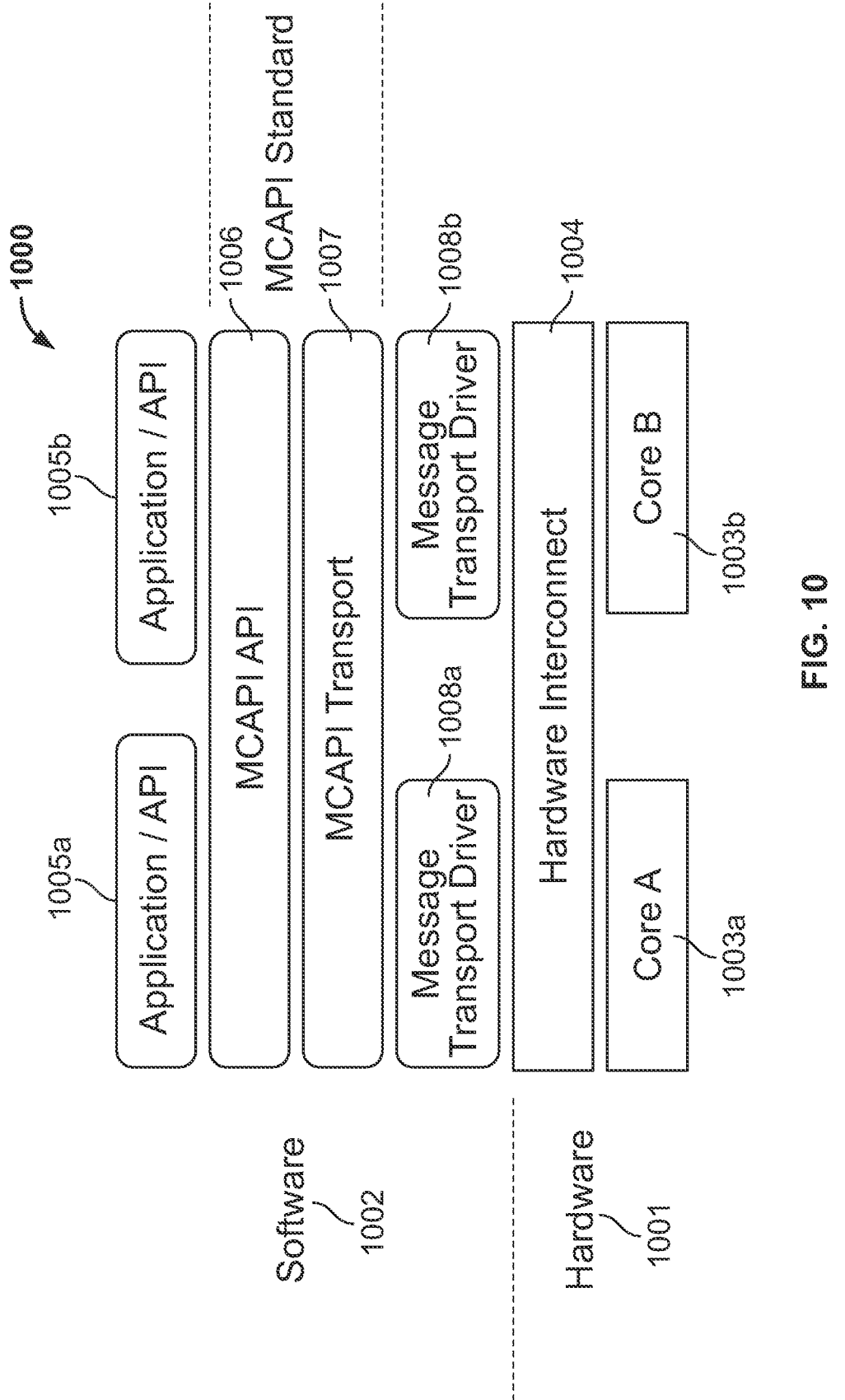

FIGS. 9-10 show example block diagrams illustrating a many-core SoC software stack structure for implementing MCAPI on the FPGA 200 in FIG. 2. For example, the circuit structures shown in FIGS. 2-3 and 6 may be operated with the software stack structure as shown in FIGS. 9-10. The protocol illustrated in FIGS. 9-10, MCAPI, is a message passing protocol (similar to MPI) for tightly coupled dis-tributed memory systems. A message passing programming model is enabled using MCAPI to support a large existing body of software code so that a potential customer can leverage their previous development investment.

Alternatively, as the SoC-FPGAs (e.g., illustrated in FIGS. 2-3 and 5-6) have shared memory, a programming model for shared memory systems may be used, such as OpenMP. In this case, OpenMP may yield better data performance due to the less overhead for parallel program-ming using a shared memory parallel programming model. Share memory parallel processing using OpenMP, however, may be difficult to achieve cache coherency, e.g., by scaling past 8 processors using data snooping. A directory based coherency scheme may be adopted to scale processors with acceptable overhead.

The hardware layer 901 may include a Hardware Proces-sor System (HPS) 903 (e.g., similar to the control processor 201 in FIG. 2, etc.), a many-core node structure (e.g., similar to the hardened DSPs 204 in FIG. 2, vector processors 401 in FIG. 4, vector processor node 501 in the mesh intercon-nect structure in FIG. 5, etc.), a hardware interconnect structure 905 (e.g., similar to the column-based sector struc-ture 400 in FIG. 4, or the mesh interconnect structure 500 in FIG. 5, etc.).

The HPS 903 and the many-core node 904 may each have a software stack for an application 906 to be instantiated upon, including the application APIs 907*a-b*, message logi-cal layers 908*a-b*, message physical layers 909*a-b* and message transport layers 910*a-b*, respectively. Specifically, for the software stack structure for the many-core node 904, the API function 907*b* may be implemented by OpenCV, OpenCL, and/or the like; the message logical layer 908*b* can be implemented under a client-server protocol; the message physical layer 909*b* can be implemented using openMCAPI; and the message transport driver 910*b* can be implemented using a MCAPI driver.

Continuing on with FIG. 10, a physical layer structure 1000 implemented with openMCAPI is shown. In the hard-ware layer 1001, cores A 1003*a* and B 1003*b* (e.g., similar to the many-core node 904 in FIG. 9) can be interconnected via the hardware interconnect structure 1004 (e.g., similar to the counterpart hardware interconnect 905 in FIG. 9). In the software layer 1002, the applications and application APIs 1005*a-b* for cores 1003*a-b*, respectively, can interface with a MCAPI API layer 1006 and a MCAPI transport layer 1007, which are implemented using the MCAPI standards, to communicate with the message transport drivers 1008*a-b*, respectively. Specifically, in the software stack structure 1002, messages can be passed between layers in user-space without Kernel-level routing or decision, or any additional requirements. As the software layer 1002 does not contain a specific protocol (in contrast with 908*b* in FIG. 9 that operates with a client-server protocol), data passing through the layers may not be defined as to what the data means. The OpenMCAPI structure 1000 can be built and maintained in public trees, and thus it allows multiple parties (e.g., differ-ent users, etc.) to create patches and push-backs.

Figure 11:
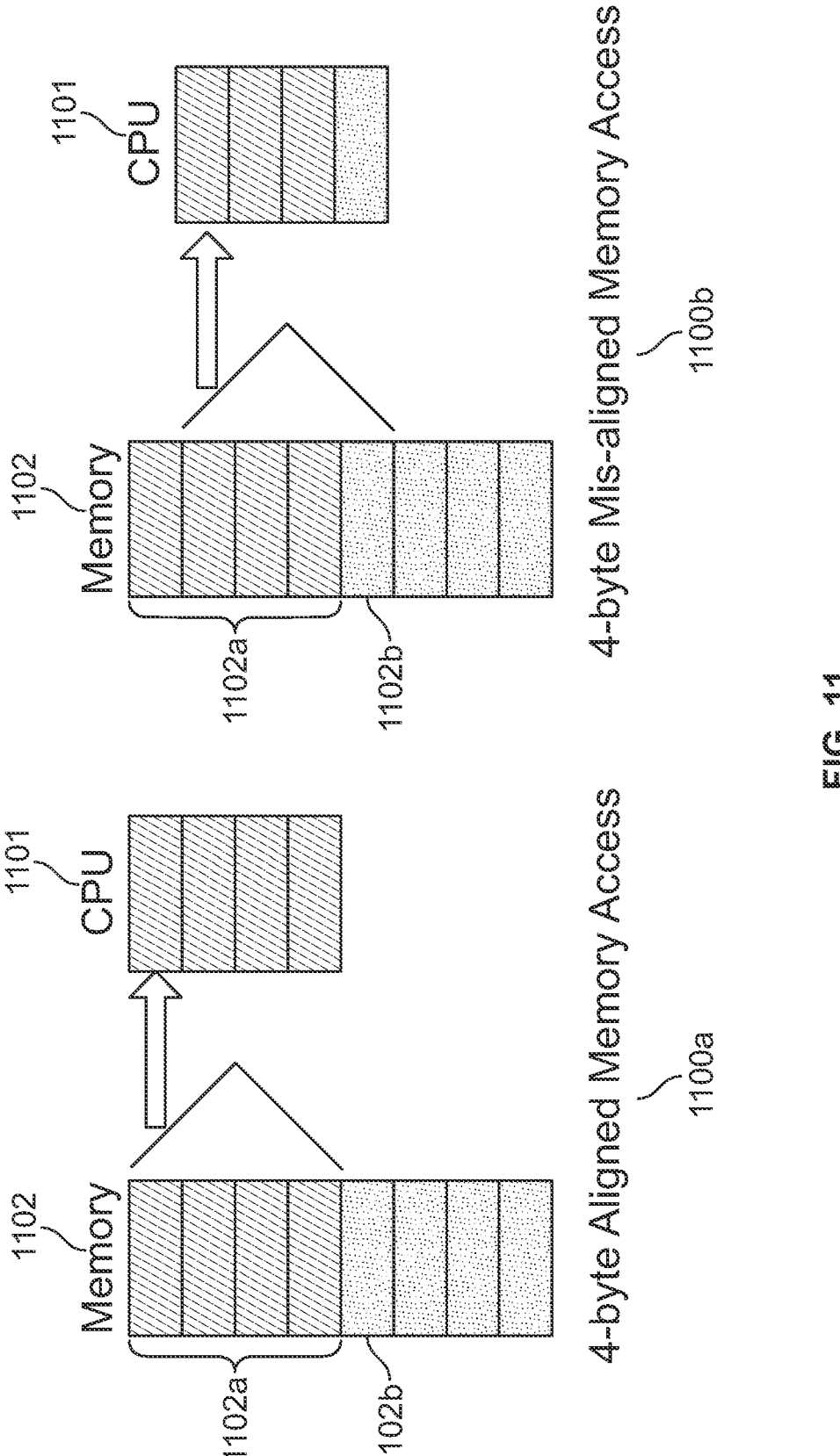
FIG. 11 shows an example block diagram illustrating aspects of data alignment at an alignment unit (e.g., similar to 603 in FIG. 6) of a programmable circuit.

FIG. 11 shows an example block diagram illustrating aspects of data alignment at an alignment unit (e.g., similar to 603 in FIG. 6) of a programmable circuit. In a circuit (e.g., such as 200 in FIG. 2), the CPU 1101 (e.g., 215 in FIG. 2) does not read from or write to memory 1102 (e.g., 216 in FIG. 2) one byte at a time. Instead, CPU 1101 accesses memory 1102 in 2-, 4-, 8-, 16-, or 32-byte chunks at a time, e.g., as shown at 1100*a*, the CPU 1101 accesses the memory 1102 in a 4-byte chunk 1102*a*. In this way, data performance can be improved because accessing an address on a 4-byte or 16-byte boundary is faster than accessing an address on a 1-byte boundary. The memory access, however, may be mis-aligned when the memory blocks are slotted into chunks, e.g., as shown at 1100*b*, when the CPU 1101 can access a mis-aligned 4-byte chunk including 3 bytes from the chunk 1102, and another byte 1102*b* in the memory 1102.

Figure 12:
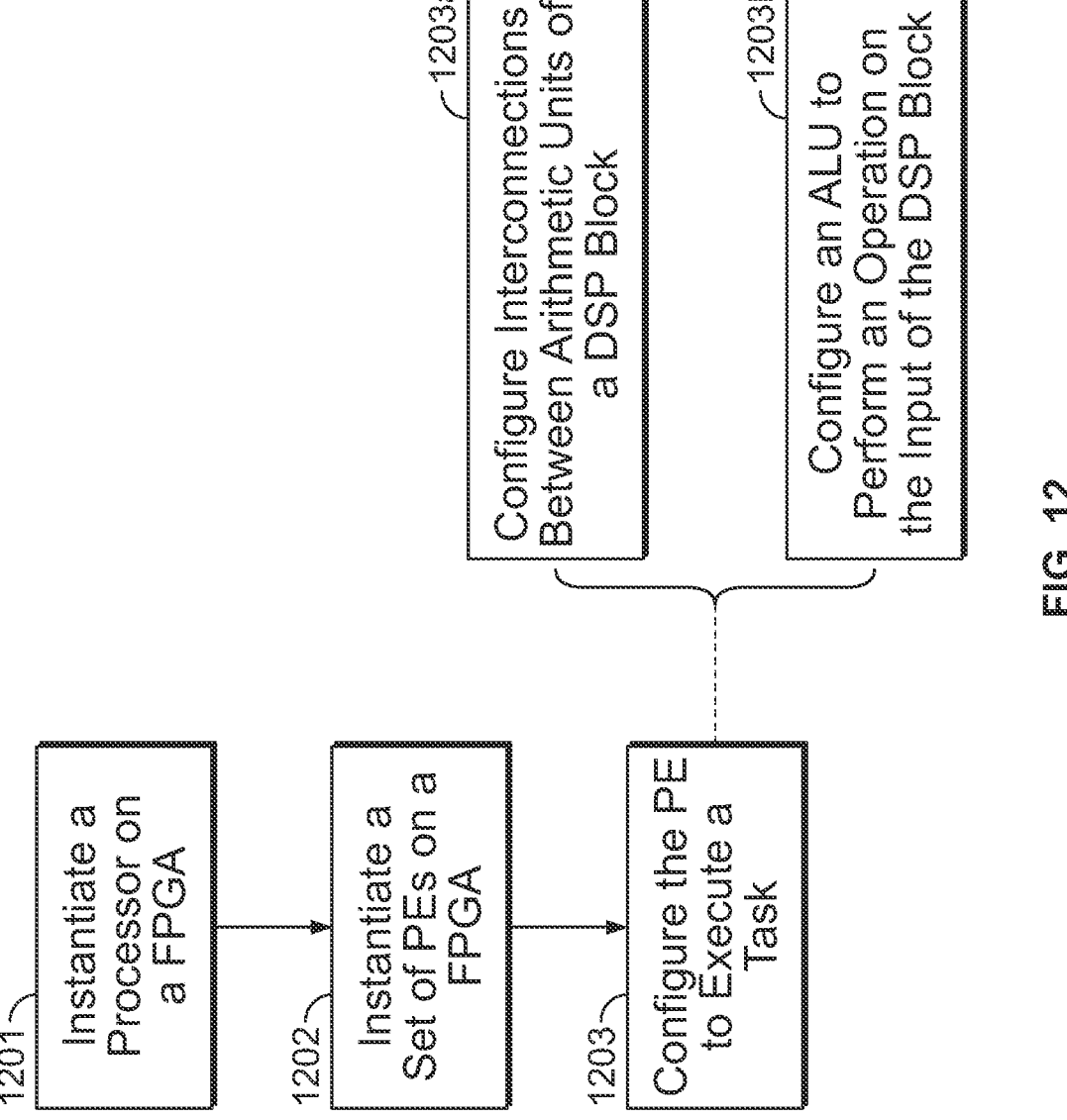
FIG. 12 is an example logic flow diagram illustrating aspects of configuring an accelerated processor (which can be configured as the accelerator 200 in FIG. 2)

FIG. 12 is an example logic flow diagram illustrating aspects of configuring an accelerated processor (which can be configured as the accelerator 200 in FIG. 2). A processor (which can be analogous to the control processor 201 in FIG. 2) can be provided or instantiated on a FPGA, at 1201. A set of PEs (which can be analogous to the DSPs 204 in FIG. 2) can be provided or instantiated on the FPGA. The PEs can have a structure analogous to 800 in FIG. 8, e.g., including a DSP block 809 and an ALU 811. The PEs can then be configured to execute a task, at 1203, e.g., calculating a fast fourier transform (FFT) of an input signal, etc. For example, the PE can be configured by configuring the interconnections between the arithmetic units of a DSP block within the PE, at 1203*a*; and by configuring an ALU within the PE to perform an arithmetic operation on the input data of the DSP block, at 1203*b*.

Figure 13:
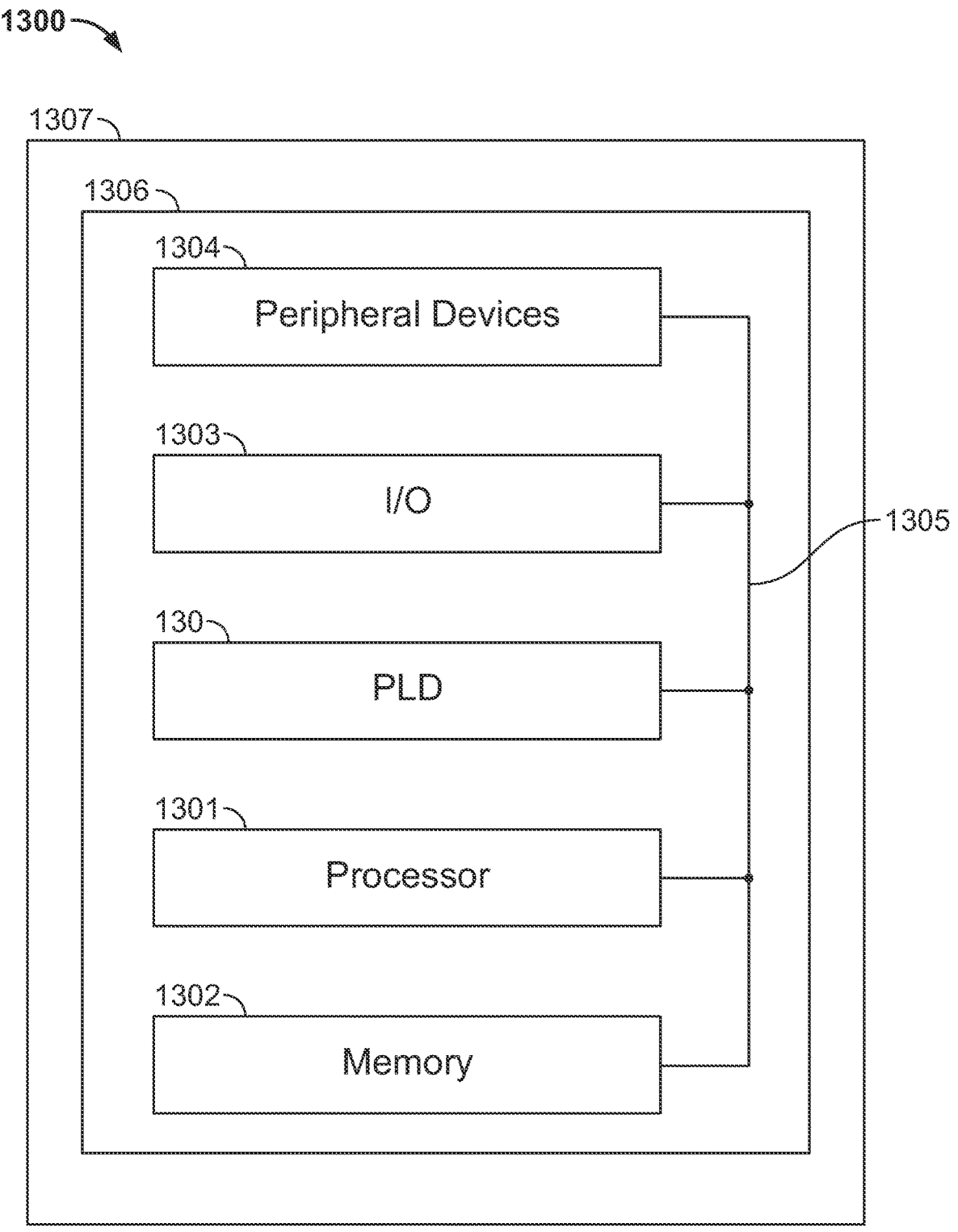
FIG. 13 is a simplified block diagram of an exemplary system employing a programmable logic device incorporating the present invention.

FIG. 13 is a simplified block diagram of an exemplary system employing a programmable logic device incorporating the present invention. A PLD 130 configured to include processor and arithmetic circuitry according to any implementation of the present invention may be used in many kinds of electronic devices. One possible use is in an exemplary data processing system 1300 shown in FIG. 13. Data processing system 1300 may include one or more of the following components: a processor 1301 (e.g., similar to the host CPU 215 in FIG. 2); memory 1302 (e.g., similar to memory 216 in FIG. 2); I/O circuitry 1303; and peripheral devices 1304. These components are coupled together by a system bus 1305 and are populated on a circuit board 1306 which is contained in an end-user system 1307.

System 1300 can be used in a wide variety of applications, such as computer networking, data networking, instrumentation, video processing, digital signal processing, Remote Radio Head (RRH), or any other application where the advantage of using programmable or reprogrammable logic is desirable. PLD 130 can be used to perform a variety of different logic functions. For example, PLD 130 can be configured as a processor or controller that works in cooperation with processor 1301. PLD 130 may also be used as an arbiter for arbitrating access to shared resources in system 1300. In yet another example, PLD 130 can be configured as an interface between processor 1301 and one of the other components in system 1300. It should be noted that system 1300 is only exemplary, and that the true scope and spirit of the invention should be indicated by the following claims.

Various technologies can be used to implement PLDs 120 as described above and incorporating this invention.

Figures 14, 15:
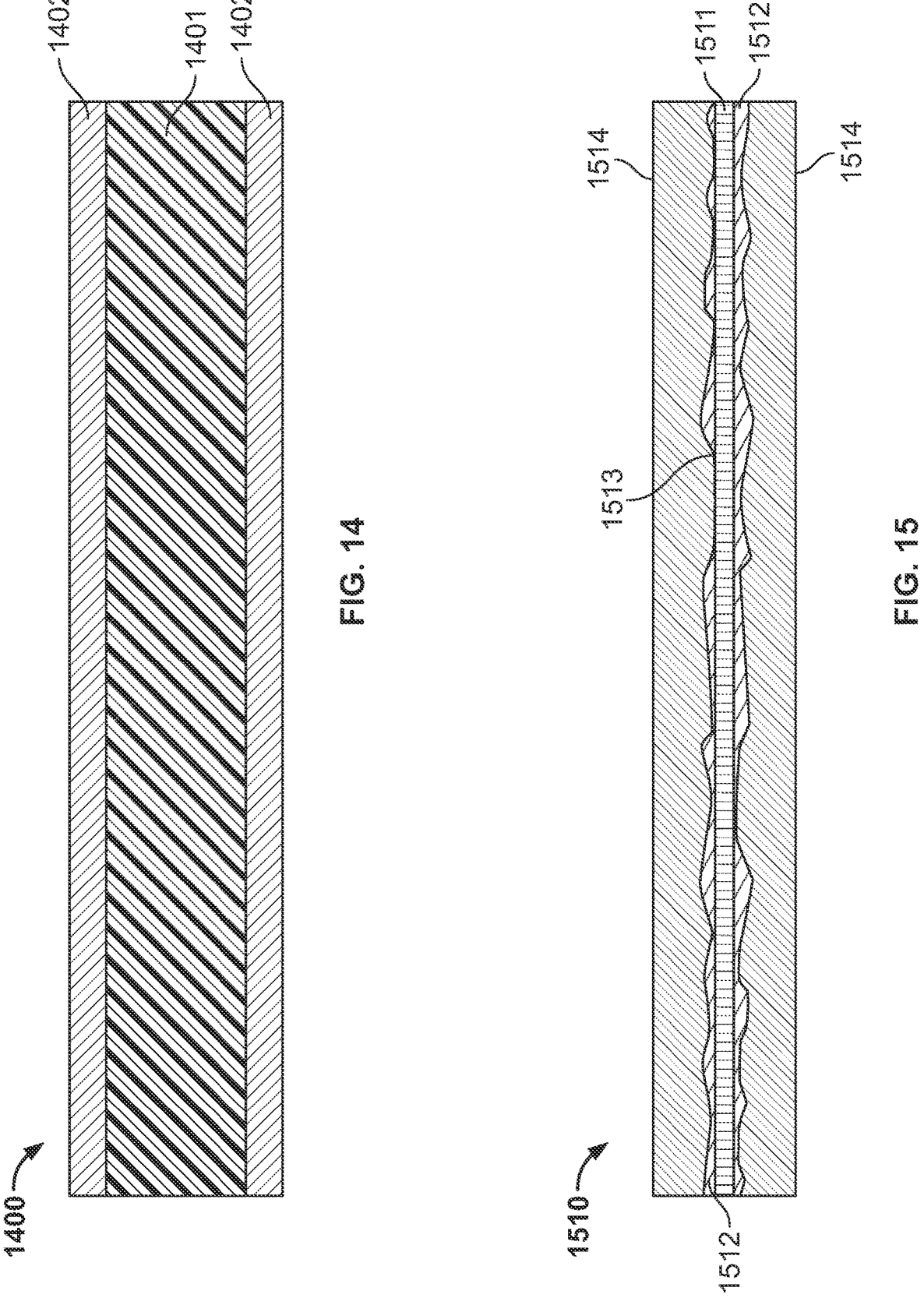
FIG. 14 presents a cross section of a magnetic data storage medium 1400 which can be encoded with a machine executable program that can be carried out by systems such as the aforementioned personal computer, or other computer or similar device.
FIG. 15 shows a cross section of an optically-readable data storage medium 1510 which also can be encoded with such a machine-executable program, which can be carried out by systems such as the aforementioned personal computer, or other computer or similar device.

FIG. 14 presents a cross section of a magnetic data storage medium 1400 which can be encoded with a machine executable program that can be carried out by systems such as the aforementioned personal computer, or other computer or similar device. Medium 1400 can be a floppy diskette or hard disk, or magnetic tape, having a suitable substrate 1401, which may be conventional, and a suitable coating 1402, which may be conventional, on one or both sides, containing magnetic domains (not visible) whose polarity or orientation can be altered magnetically. Except in the case where it is magnetic tape, medium 1400 may also have an opening (not shown) for receiving the spindle of a disk drive or other data storage device.

The magnetic domains of coating 1402 of medium 1400 are polarized or oriented so as to encode, in manner which may be conventional, a machine-executable program, for execution by a programming system such as a personal computer or other computer or similar system, having a socket or peripheral attachment into which the PLD to be programmed may be inserted, to configure appropriate portions of the PLD, including its specialized processing blocks, if any, in accordance with the invention.

FIG. 15 shows a cross section of an optically-readable data storage medium 1510 which also can be encoded with such a machine-executable program, which can be carried out by systems such as the aforementioned personal computer, or other computer or similar device. Medium 1510 can be a conventional compact disk read-only memory (CD-ROM) or digital video disk read-only memory (DVD-ROM) or a rewriteable medium such as a CD-R, CD-RW, DVD-R, DVD-RW, DVD+R, DVD+RW, or DVD-RAM or a magneto-optical disk which is optically readable and magneto-optically rewriteable. Medium 1510 preferably has a suitable substrate 1511, which may be conventional, and a suitable coating 1512, which may be conventional, usually on one or both sides of substrate 1511.

In the case of a CD-based or DVD-based medium, as is well known, coating 1512 is reflective and is impressed with a plurality of pits 1513, arranged on one or more layers, to encode the machine-executable program. The arrangement of pits is read by reflecting laser light off the surface of coating 1512. A protective coating 1514, which preferably is substantially transparent, is provided on top of coating 1512.

In the case of magneto-optical disk, as is well known, coating 1512 has no pits 1513, but has a plurality of magnetic domains whose polarity or orientation can be changed magnetically when heated above a certain temperature, as by a laser (not shown). The orientation of the domains can be read by measuring the polarization of laser light reflected from coating 1512. The arrangement of the domains encodes the program as described above.

It will be understood that the foregoing is only illustrative of the principles of the invention, and that various modifications can be made by those skilled in the art without departing from the scope and spirit of the invention. For example, the various elements of this invention can be provided on a PLD in any desired number and/or arrangement. One skilled in the art will appreciate that the present invention can be practiced by other than the described embodiments, which are presented for purposes of illustration and not of limitation, and the present invention is limited only by the claims that follow.

What is claimed is:

1. An integrated circuit comprising:
   an accelerator comprising processing nodes arranged in a grid, wherein each of the processing nodes comprises a vector processor that supports a vector data format, wherein the vector processor in each of the processing nodes comprises processing elements and a command processor that performs fetch and dispatch of first instructions for the processing elements, wherein each of the processing elements in the vector processor in each of the processing nodes comprises a multiplier, and wherein each of the processing nodes further comprises local memory;
   memory blocks;
   a dedicated control subsystem to execute software instructions and to control the processing nodes; and
   a mesh network that interconnects the processing nodes and the memory blocks.

2. The integrated circuit of claim 1, wherein the mesh network allows for data movement between the processing nodes using mesh routers in the processing nodes.

3. The integrated circuit of claim 1, wherein each of the processing elements further comprises a local register file, an arithmetic logic unit, and a load/store unit that interface with a data rotate unit and data memory unit.

4. The integrated circuit of claim 3, wherein the accelerator supports data-level parallelism through Single Instruction, Multiple Data (SIMD) vector execution and thread level parallelism.

5. The integrated circuit of claim 1, wherein the mesh network comprises a mesh router that connects one of the processing nodes to an external memory via a cache coherency unit such that data in cache units connected to different ones of the processing nodes are consistent.

6. The integrated circuit of claim 1, wherein the command processor further comprises an instruction memory that stores instructions for execution by the command processor, a decoder, a scalar register file, an execution module to execute instructions in the instruction memory, and a load/store unit to load or store instructions from data stores in the accelerator.

7. The integrated circuit of claim 1, wherein the mesh network comprises a network-on-chip that accesses software instructions from a second memory.

8. The integrated circuit of claim 1, wherein the processing nodes provide floating point precision.

9. The integrated circuit of claim 1, wherein the command processor in each of the processing nodes coordinates execution on functional units comprising an instruction memory that stores instructions for execution by the command processor, a register file, and an execution module to execute instructions in the instruction memory.

10. The integrated circuit of claim 1, wherein the local memory in each of the processing nodes comprises a data rotate unit.

11. The integrated circuit of claim 1, wherein each of the processing nodes further comprises a mesh router that routes a connection to other ones of the processing nodes arranged in the grid.

12. The integrated circuit of claim 1, wherein the processing nodes in the accelerator are arranged in at least 4 columns and at least 4 rows in the grid.

13. The integrated circuit of claim 1, wherein execution of processor instructions is pipelined by a series of pipeline registers, and wherein the processor instructions are processed at the processing elements.

14. A method for operating an integrated circuit:

receiving, by an accelerator in the integrated circuit that comprises processing nodes arranged in a grid, a first set of software instructions using a mesh network that interconnects the processing nodes;

executing a second set of software instructions using a dedicated control subsystem that controls the processing nodes, wherein the dedicated control subsystem is in the integrated circuit, wherein each of the processing nodes comprises local memory, and wherein each of the processing nodes further comprises a vector processor that supports a vector data format; and coordinating execution of the first set of software instructions for processing elements using a control processor, wherein the vector processor in each of the processing nodes comprises the processing elements and the control processor, and wherein each of the processing elements in the vector processor in each of the processing nodes comprises a multiplier.

15. The method of claim 14 further comprising supporting thread level parallelism using the accelerator.

16. The method of claim 14 further comprising allowing data movement between the processing nodes using mesh routers in the processing nodes in the mesh network.

17. The method of claim 14, wherein the processing nodes provide floating point operations.

18. The method of claim 14 further comprising supporting data-level parallelism through Single Instruction, Multiple Data (SIMD) vector execution using the accelerator.

19. The method of claim 14, wherein each of the processing nodes further comprises a data rotate unit.

20. The method of claim 14, wherein coordinating execution of the first set of software instructions for the processing elements further comprises performing fetch, decode, and dispatch of the first set of software instructions for the processing elements using the control processor.

21. The method of claim 14, wherein further comprising processing the first set of software instructions at the processing elements.

22. An integrated circuit comprising:

an accelerator comprising processing nodes arranged in a grid, wherein each of the processing nodes comprises a vector processor, wherein each of the processing nodes further comprises local memory, wherein each of the processing nodes further comprises a processing element and a control processor that coordinates execution on functional units, and wherein the control processor performs fetch and dispatch of first instructions for the processing element, and wherein the processing element in each of the processing nodes comprises a multiplier;

a network-on-a-chip that accesses software instructions from a second memory;

a dedicated control subsystem that executes the software instructions and that controls the processing nodes; and a mesh network that interconnects the processing nodes.

23. The integrated circuit of claim 22 wherein the control processor further comprises an instruction memory that stores instructions for execution by the control processor, a decoder, a scalar register file, an execution module to execute instructions in the instruction memory, and a load/store unit to load or store instructions from data stores in the accelerator.

24. The integrated circuit of claim 22, wherein the processing nodes provide floating point precision.

25. The integrated circuit of claim 22, wherein the vector processor in each of the processing nodes comprises the control processor and processing elements that comprise the processing element.

26. The integrated circuit of claim 22, wherein the processing element in each of the processing nodes further comprises a local register file, an arithmetic logic unit, and a load/store unit that interface with a data rotate unit and data memory unit.

* * * * *